United States Patent
Yeung et al.

(10) Patent No.: US 8,570,680 B2
(45) Date of Patent: *Oct. 29, 2013

(54) PAD BIT INJECTION DURING READ OPERATION TO IMPROVE FORMAT EFFICIENCY

(75) Inventors: Kwok W. Yeung, Milpitas, CA (US); Kai Keung Chan, Fremont, CA (US); Paul K. Lai, San Jose, CA (US)

(73) Assignee: SK hynix memory solutions inc., San Jose, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/113,926

(22) Filed: May 23, 2011

(65) Prior Publication Data

US 2012/0019950 A1  Jan. 26, 2012

Related U.S. Application Data

(63) Continuation of application No. 11/787,230, filed on Apr. 13, 2007, now Pat. No. 7,974,033.

(51) Int. Cl.
  *G11B 5/09* (2006.01)
  *G11B 5/02* (2006.01)
(52) U.S. Cl.
  USPC ................................. 360/50; 360/48; 360/55
(58) Field of Classification Search
  None
  See application file for complete search history.

(56) References Cited

U.S. PATENT DOCUMENTS

| 5,276,564 | A  * | 1/1994 | Hessing et al. | 360/51 |
| 7,484,167 | B2 * | 1/2009 | Park et al. | 714/801 |
| 7,525,747 | B2 * | 4/2009 | Sai et al. | 360/46 |

* cited by examiner

*Primary Examiner* — Daniell L Negron
(74) *Attorney, Agent, or Firm* — Van Pelt, Yi and James LLP

(57) ABSTRACT

Injecting pad bits during a read operation to improve format efficiency is disclosed. In some embodiments, a pad sequence associated with error correction is not stored in a sector on a disk. Instead, the pad sequence is merged at a read channel with data stored in a sector that is accessed by the read channel.

20 Claims, 7 Drawing Sheets

| Sector | Size |
|---|---|
|  |  |
|  |  |
|  |  |
|  |  |
|  |  |
|  |  |
|  |  |
|  |  |

|  | wedge1 | wedge2 | ... | wedgeM |
|---|---|---|---|---|
| track1 |  |  |  |  |
| track2 |  |  |  |  |
| ⋮ |  |  |  |  |
| trackN |  |  |  |  |

PAD BIT INJECTION DURING READ OPERATION TO IMPROVE FORMAT EFFICIENCY

CROSS REFERENCE TO OTHER APPLICATIONS

This application is a continuation of co-pending U.S. patent application Ser. No. 11/787,230 entitled PAD BIT INJECTION DURING READ OPERATION TO IMPROVE FORMAT EFFICIENCY filed Apr. 13, 2007 which is incorporated herein by reference for all purposes.

BACKGROUND OF THE INVENTION

Typically, each sector of a disk includes several bits of overhead data in addition to actual data. A trend in storage systems is towards increased capacity. For example, with the popularity of digital cameras and portable music players, users want to store more and more image files, audio files, or other information. Thus, there is a need for an improvement in format efficiency in order to increase the capacity of disk storage systems.

BRIEF DESCRIPTION OF THE DRAWINGS

Various embodiments of the invention are disclosed in the following detailed description and the accompanying drawings.

FIG. 6(*b*) illustrates an embodiment of a structure of a table for storing size information.

FIG. 6(*c*) illustrates an embodiment of a manner for dividing a disk.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Injecting pad bits during a read operation to improve format efficiency is disclosed. In some embodiments, a pad sequence associated with error correction is not stored in a sector on a disk. Instead, the pad sequence is merged at a read channel with data stored in a sector that is accessed by the read channel.

Figure 1:
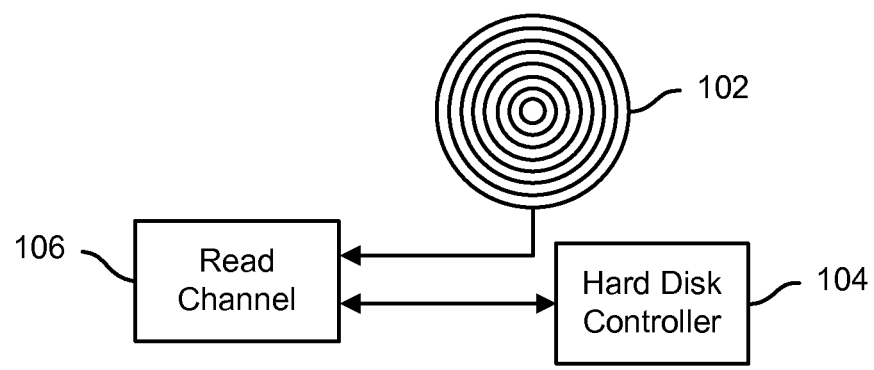
FIG. 1 illustrates an embodiment of a system for reading data from a hard disk.

FIG. 1 illustrates an embodiment of a system for reading data from a hard disk. Data is stored on disk 102. Hard disk controller 104 facilitates communication with disk 102. When data is desired to be read from disk 102, hard disk controller 104 asserts a read gate (RG) signal to read channel 106, causing read channel 106 to read data from disk 102. For example, if an RG signal is high or 1, read channel 106 reads data from disk 102. The data stored on disk 102 is read, digitized, and decoded by read channel 106. In various embodiments, read channel 106 includes an analog-to-digital converter and/or other circuitry for decoding the data read from disk 102.

Figure 2:
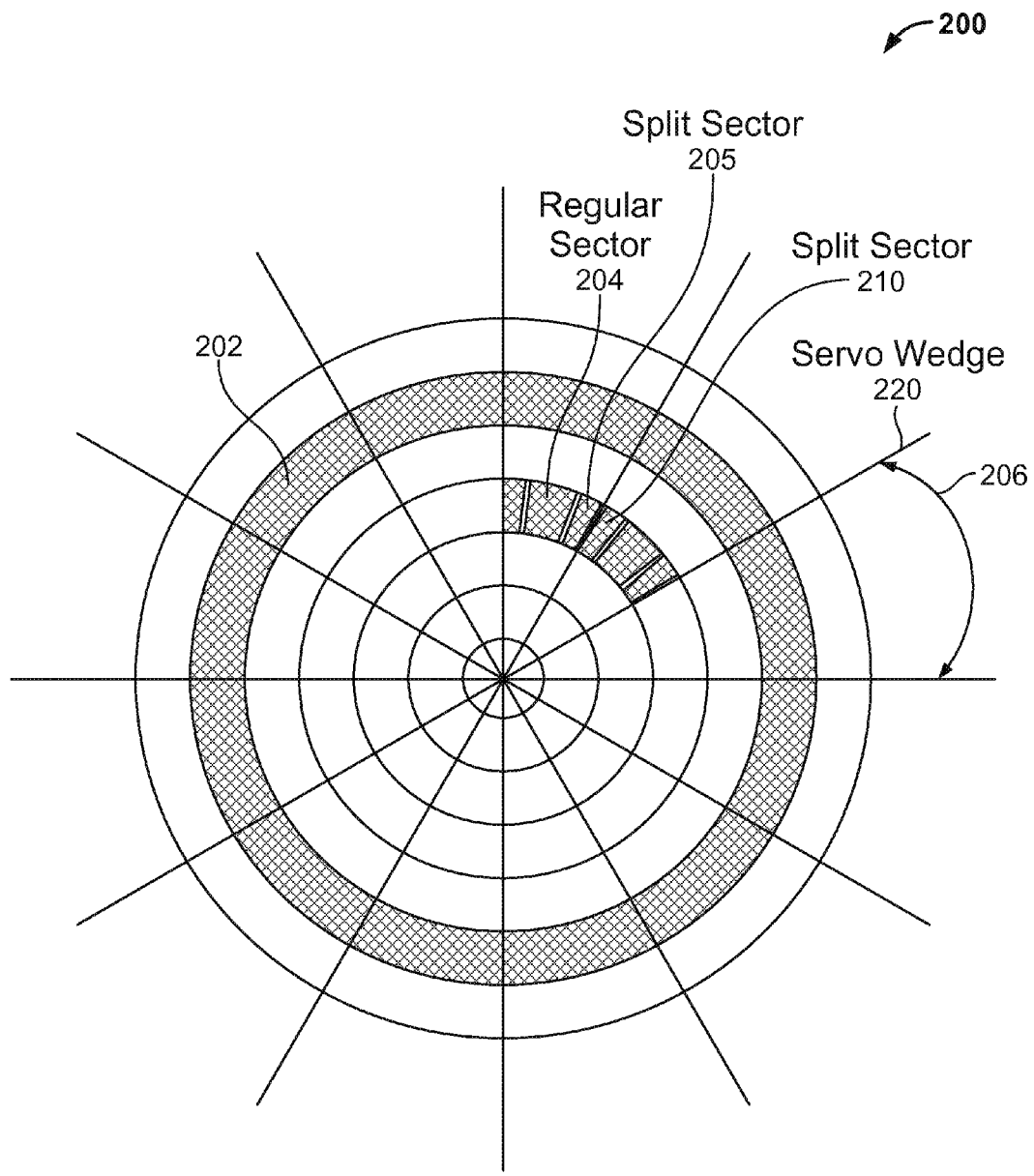
FIG. 2 illustrates a typical embodiment of a disk.

FIG. 2 illustrates a typical embodiment of a disk such as disk 102 of FIG. 1. Data is stored on disk 200 on a plurality of circular tracks, such as track 202. Disk 200 is divided into a plurality of wedges, such as wedge 206. Each track spans multiple wedges. Consecutive wedges are separated by servo wedges, such as servo wedge 220, which assist in the mechanical positioning of the read/write head over the disk. A track of a wedge may include one or more sectors, such as sector 204. A sector typically stores a fixed amount of data, e.g., 512 bytes of data. In addition to actual user and/or application data, a sector also stores control or overhead data needed for, for example, disk and data management. The format of a sector is determined by an associated manufacturer and may depend on the model of an associated disk drive. In some cases, the actual (user and/or application) data associated with a sector may be divided across a plurality of split sectors. This may occur, for example, when a sector of a track is written near the edge of a wedge and enough room to write the entire sector within the wedge on the given track does not exist. In such cases, the sector is divided into a plurality of split sectors as shown for sectors 205 and 210 in FIG. 2.

Figure 3:
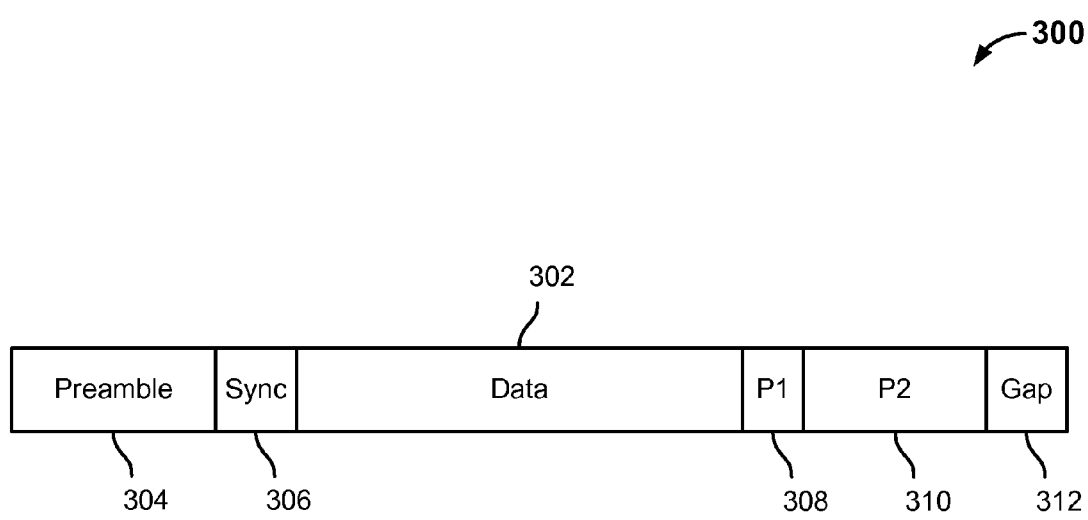
FIG. 3 illustrates an embodiment of a typical sector format.

FIG. 3 illustrates an embodiment of a typical sector format. As illustrated, sector 300 includes the actual (user and/or application) data 302 as well as a plurality of overhead fields 304-312. The preamble field 304 includes, for example, identification information associated with sector 300, information associated with timing recovery, etc. The synchronization field 306 includes information that indicates the starting point of the actual data 302 and is employed to guide a read process. The P1 field 308 and P2 field 310 include pad bits. The P1 field 308 includes pad bits to pick up inter-symbol interference from the last few bits of data 302. In the cases in which a non-causal, finite impulse response equalization scheme is employed in an associated read channel, the P1 field 308 will, for example, affect the last few bits of data 302. The P2 field 310 includes a pad sequence that is employed, for example, to mitigate errors resulting from reading data over a noisy or non-ideal channel. For example, the P2 field 310 may include pad bits of the length needed to merge all the survivor paths of a Viterbi detector employed in a read channel. The sizes of the P1 field 308 and the P2 field 310 are in many cases implementation specific. For example, the size of the P1 field 308 may be in the range of 4-5 bits, and the size of the P2 field 310 may be in the range of 10-24 bits. Gap 312 separates consecutive sectors and provides a margin of tolerance for the actual span or size of a sector which may vary from an ideal value due to limitations in the mechanical precision achievable when writing the data associated with the sector to disk. The sector format depicted in FIG. 3 may be employed for regular (i.e. non-split) and split sectors.

Figure 4:
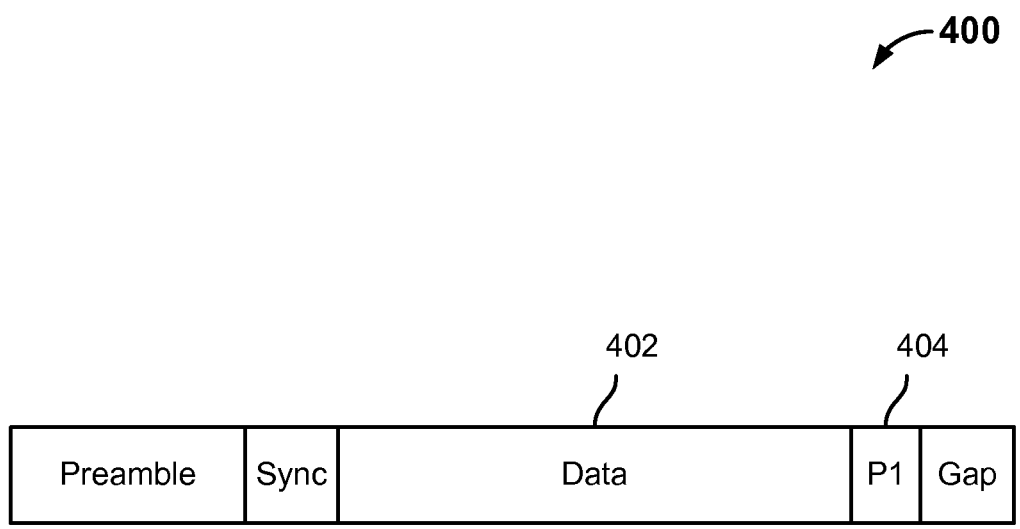
FIG. 4 illustrates an embodiment of an improved sector format.

The format efficiency of a disk is the percentage of actual data (i.e. data 302 in FIG. 3) that is or can be stored on the disk. It would be useful to reduce the overhead data included in each sector so that a greater density of actual data can be stored. As disclosed in detail herein, the format efficiency of a disk can be improved by eliminating at least some of the pad bits included in each sector. For example, the P2 pad sequence (i.e. P2 field 310 in FIG. 3) is in many cases constant for a given class of channel or channel response. In various cases, the P2 pad sequence may be constant across an entire disk or may be constant across different regions or zones of the disk that exhibit the same or similar channel characteristics. Thus, it is inefficient to include the P2 pad sequence in each sector. The format efficiency of a disk can be improved, in some embodiments, if the P2 pad sequence is eliminated from each sector and is instead injected at the appropriate point during a read process at the read channel. FIG. 4 illustrates an embodiment of an improved sector format that eliminates the P2 pad sequence. Such a sector format may be employed for regular and split sectors.

In some embodiments, knowledge of the size of the actual data in each sector is needed in order to determine when to inject the P2 pad sequence during a read process at a read channel. Referring to the example of FIG. 4, after the actual data 402 and the P1 pad sequence 404 of a sector 400 are read from disk, the P2 pad sequence is injected at the read channel. In such cases, the P2 pad sequence is not included in sector 400 but is instead available or otherwise obtained at the read channel. In some embodiments, the size of the actual data 402 of most, if not all, regular sectors of a disk is a prescribed standard size, e.g., 512 bytes. Similarly, in some embodiments, the size of the P1 pad sequence 404 is also a prescribed value, e.g., 4 bits, for most, if not all, sectors of a disk. However, the size of the actual data 402 of a split sector may be different from a prescribed standard size associated with regular (i.e. non-split) sectors.

Figure 5:
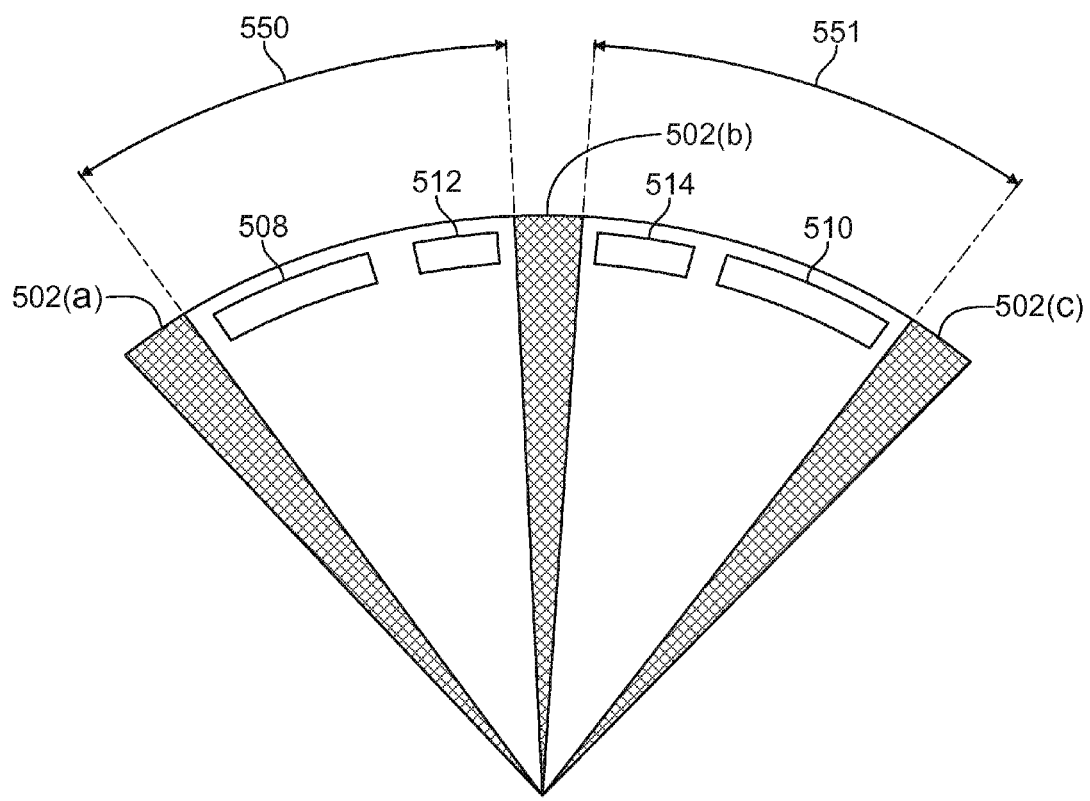
FIG. 5 illustrates an embodiment in which a sector is divided into split sectors.

FIG. 5 illustrates an embodiment in which a sector is divided into two split sectors. In the given example, two wedges, wedge 550 between servo wedges 502(a) and 502(b) and wedge 551 between servo wedges 502(b) and 502(c), of a disk are depicted. Regular sectors 508 and 510 are included in wedges 550 and 551, respectively. However, because enough room does not exist in wedge 550 to include all of the data associated with another regular (i.e. non-split) sector, the sector is divided into two split sectors 512 and 514. In this example, each of the split sectors 512 and 514 is formatted like a regular sector (e.g., 400 of FIG. 4) and includes actual data as well as overhead data fields, such as a preamble field, synchronization field, P1 field, etc. In some embodiments, the combined amount of actual data (i.e. 402 of FIG. 4) included in split sectors 512 and 514 is equivalent to the prescribed amount of actual data associated with regular sectors of a disk, e.g., so that there is a total of 512 bytes. In some embodiments, at the read channel level, the split sectors are treated like individual regular sectors and are processed by individual read processes. Once the read processes associated with the two split sectors are completed, the actual data associated with the split sectors may be combined.

Figures 6A, 6B, 6C:
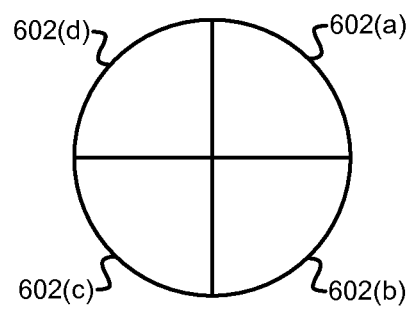
FIG. 6(*a*) illustrates an embodiment of a structure of a table for storing size information.

Since the size of the actual data (i.e. 402 of FIG. 4) included in a sector may vary from a prescribed standard size (e.g., if the sector is a split sector), in some embodiments, size information of a sector is needed at the read channel to properly inject the P2 pad sequence at an appropriate point during a read process. Such size information may be available or otherwise obtained at the read channel. For example, size information may be provided to the read channel from the hard disk controller via a dedicated interface. In various embodiments, the size information may specify the size of the entire sector, the size of the actual data (i.e. 402 of FIG. 4) in the sector, the combined size of the actual data and the P1 sequence (which is in many cases of a constant prescribed size), etc. In some embodiments, the size information associated with sectors of a disk is stored in a table, which may be stored, for example, on disk, in RAM, or other storage. Such a table may include, for example, a size entry for each sector that specifies either a prescribed standard size for regular sectors or a reduced size if the sector is a split sector. An example of the structure of such a table is depicted in FIG. 6(a). In some cases, a more compact scheme may be employed to store size information in a table. For example, in some embodiments, a table such as table 6(a) may only include size information for split sectors. In such cases, a prescribed standard size may be assumed for sectors not included in the table. In the cases in which a sector is split into two split sectors, in some embodiments, only the size information associated with one of the split sectors may be specified, since the size of the other split sector can be computed by subtracting the size specified for one of the split sectors from the prescribed standard size of a regular sector.

In some embodiments, a table for storing size information is indexed by track and wedge identifiers. An example of the structure of such a table is depicted in FIG. 6(b). In such a scheme, for example, a prescribed standard size is assumed for regular sectors, and size information is only specified for split sectors. If a wedge includes both a split sector at the beginning and at the end of the wedge for a given track, size information for both split sectors may be specified for that wedge in an associated cell of the table. In some embodiments, sectors are only split at most into two split sectors that are included in two consecutive wedges. For instance, a sector of a track may be split into a first split sector that is included at the end of a first wedge and a second split sector that is included at the beginning of a second consecutive wedge. In such cases, for example, size information associated with the first split sector may be included in the cell of the table associated with the first wedge for the given track, and size information associated with the second split sector may not be specified but instead may be computed, for example, by subtracting the size specified for the first split sector from the prescribed standard size of a regular sector. Thus, in such a scheme, the size information included in a cell of a table for a given track and wedge, if any, is associated with a split sector included at the end of the given wedge.

In some embodiments, a disk is divided into a plurality of equivalent portions, and the same formatting scheme is employed to write data to the various portions of the disk. In such cases, for example, a size table need only be defined for one portion and is applicable to each portion of the disk. As depicted in FIG. 6(c), for example, a disk may be divided into quarters 602(a)-(d), and the same formatting scheme may be employed to write data to each of the four quarters 602(a)-(d) of the disk. In some such cases, a size table, such as the table of FIG. 6(a) or 6(b), need only be defined for one quarter 602 and would apply to each quarter 602 of the disk. In some embodiments, the number of portions into which a disk is divided may not be an integer value. For example, a disk may be divided into 3.3 portions, with three equal portions and one of a different size. In such cases, size information may need to be separately specified for the different sized portion.

In some embodiments, instead of and/or in addition to making size information available via a table as described above, size information of the sectors of a disk may be computed via one or more prescribed formulas. Although some techniques are described above, in other embodiments, any appropriate manner for storing, computing, and/or determining the size of a sector may be employed.

Figure 7:
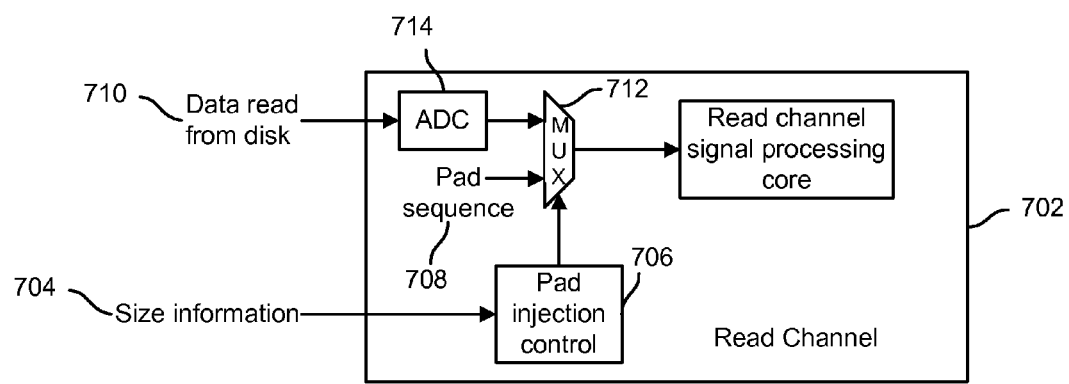
FIG. 7 illustrates an embodiment of a read channel.

FIG. 7 illustrates an embodiment of a read channel in which the P2 pad sequence is injected at the read channel. Read channel 702 receives size information 704 associated with a sector desired to be read from disk. For example, as described above, size information 704 may specify the size of a (split) sector, which may be a programmed standard size for regular (i.e. non-split) sectors. Size information 704 may be received, for example, from a hard disk controller via a size communication interface between the controller and read channel 702. Size information 704 is employed by pad injection control 706 to determine the point in the read process of the sector at which to inject the P2 pad sequence 708. For example, pad injection control 706 may include a counter to count the number of bits of data 710 received and determine when the number of bits specified by size information 704 have been received. Such a data bit counter may be started, for example, after the synchronization mark associated with the sector being read is detected. Pad injection control 706 switches multiplexer 712 from analog-to-digital converter 714 to pad sequence 708, for example, after the number of bits indicated by size information 704, the number of bits associated with a programmed standard size, and/or a programmed value of P1 pad bits have been received. Pad sequence 708 may be available at read channel 702 or may otherwise be obtained at read channel 702, for example, from an associated controller. In some embodiments, pad sequence 708 is programmed via programmable registers. In various embodiments, pad sequence 708 may be constant across a disk or may vary over different regions or zones of the disk. In the cases in which pad sequence 708 varies over different zones of the disk, in some embodiments, pad sequences for each zone may be programmed, and a mapping table may be employed to determine the pad sequence for a particular sector depending on the zone in which it is included. Pad sequence 708 may be used, for example, in conjunction with an error corrector, such as a Viterbi detector, employed in read channel 702.

As described herein, the format efficiency of a disk can be improved by eliminating at least some of the pad bits included in a sector and instead injecting such pad bits at the read channel. Elimination of the P2 pad sequence is described in detail herein. In other embodiments, the P1 pad sequence used for inter-symbol interference can also be eliminated to achieve a better format efficiency. It may be possible to eliminate the P1 pad sequence, for example, if a read process does not introduce significant inter-symbol interference or, for example, if the error arising due to inter-symbol interference in the last few bits of the actual data can be adequately corrected using appropriate signal processing circuitry at the read channel. In some embodiments, the P1 pad sequence 404 can be eliminated from a sector 400 if it can be encoded a priori with a predetermined inter-symbol interference based on the last few bits of data 402.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, at a processor, data stored in a sector of a disk;
   using the processor to determine size information associated with the sector, including by:
      determining if a table contains the size information;
      in the event the table contains the size information, using the size information stored in the table; and
      in the event the table does not contain the size information, using a default size;
   using the processor to determine, based at least in part on the size information, a point at which to insert a pad sequence associated with error correction; and
   inserting the pad sequence after the data at the determined point, wherein the pad sequence is not stored in the sector.

2. A method as recited in claim 1, wherein the pad sequence comprises one of a plurality of pad sequences.

3. A method as recited in claim 1, wherein the size information specifies a size of actual data included in the sector.

4. A method as recited in claim 1, wherein the table contains the size information in the event the sector is a split sector.

5. A method as recited in claim 1, wherein receiving the data stored in the sector comprises counting bits of data read using a data bit counter.

6. A method as recited in claim 5, wherein the data bit counter is started once a synchronization mark of the sector is detected.

7. A method as recited in claim 5, wherein a count value of the data bit counter at which to begin inserting the pad sequence is based at least in part on the size information associated with the sector.

8. A method as recited in claim 1, wherein the pad sequence has one or more of the following properties: the pad sequence is employed with respect to a Viterbi detector, the pad sequence is constant for the entire disk, the pad sequence is constant for a zone of the disk, or the pad sequence is associated with correcting for inter-symbol interference.

9. A system, comprising:
   a processor; and
   a memory coupled with the processor, wherein the memory is configured to provide the processor with instructions which when executed cause the processor to:
      receive data stored in a sector of a disk;
      determine size information associated with the sector, including by:
         determining if a table contains the size information;
         in the event the table contains the size information, using the size information stored in the table; and
         in the event the table does not contain the size information, using a default size;
      determine, based at least in part on the size information, a point at which to insert a pad sequence associated with error correction; and
      inserting the pad sequence after the data at the determined point, wherein the pad sequence is not stored in the sector.

10. A system as recited in claim 9, wherein the table contains the size information in the event the sector is a split sector.

11. A system as recited in claim 9, wherein the instructions for receiving the data stored in the sector include instructions for counting bits of data read using a data bit counter.

12. A system as recited in claim 11, wherein the data bit counter is started once a synchronization mark of the sector is detected.

13. A system as recited in claim 11, wherein a count value of the data bit counter at which to begin inserting the pad sequence is based at least in part on the size information associated with the sector.

14. A system as recited in claim 9, wherein the pad sequence has one or more of the following properties: the pad sequence is employed with respect to a Viterbi detector, the pad sequence is constant for the entire disk, the pad sequence is constant for a zone of the disk, or the pad sequence is associated with correcting for inter-symbol interference.

15. A computer program product embodied in a non-transitory computer readable storage medium and comprising computer instructions for:
　　receiving data stored in a sector of a disk;
　　determining size information associated with the sector, including by:
　　　　determining if a table contains the size information;
　　　　in the event the table contains the size information, using the size information stored in the table; and
　　　　in the event the table does not contain the size information, using a default size;
　　determining, based at least in part on the size information, a point at which to insert a pad sequence associated with error correction; and
　　inserting the pad sequence after the data at the determined point, wherein the pad sequence is not stored in the sector.

16. A computer program product as recited in claim 15, wherein the table contains the size information in the event the sector is a split sector.

17. A computer program product as recited in claim 15, wherein the computer instructions for receiving the data stored in the sector include computer instructions for counting bits of data read using a data bit counter.

18. A computer program product as recited in claim 17, wherein the data bit counter is started once a synchronization mark of the sector is detected.

19. A computer program product as recited in claim 17, wherein a count value of the data bit counter at which to begin inserting the pad sequence is based at least in part on the size information associated with the sector.

20. A computer program product as recited in claim 15, wherein the pad sequence has one or more of the following properties: the pad sequence is employed with respect to a Viterbi detector, the pad sequence is constant for the entire disk, the pad sequence is constant for a zone of the disk, or the pad sequence is associated with correcting for inter-symbol interference.

* * * * *